United States Patent [19]

Walker

[11] Patent Number: 5,064,001
[45] Date of Patent: Nov. 12, 1991

[54] ROTARY SOIL WORKING TOOL
[75] Inventor: John C. Walker, Merredin, Australia
[73] Assignee: Walkers Merredin Pty Ltd, Merredin, Australia
[21] Appl. No.: 543,965
[22] Filed: Jun. 26, 1990
[51] Int. Cl.[5] .......................... A01B 21/04; A01B 23/02
[52] U.S. Cl. ..................................... 172/556; 172/762; 403/398
[58] Field of Search ............... 172/540, 543, 548, 551, 172/556, 705, 707, 772, 177, 772.5, 713, 762; 403/386, 387, 398; 411/400

[56] References Cited

U.S. PATENT DOCUMENTS

| 2,341,830 | 2/1944 | Uddenborg | 172/556 X |
| 2,559,232 | 7/1951 | Simon | 172/556 |
| 2,600,332 | 6/1952 | Rude et al. | 172/548 |
| 2,679,791 | 6/1954 | Carney | 403/398 X |
| 2,864,298 | 12/1958 | Toland | 172/556 |
| 3,702,638 | 11/1972 | Takata | 172/556 X |
| 3,734,201 | 5/1973 | Zaun | 172/551 |
| 4,427,076 | 1/1984 | DeAberasturi | 172/548 |
| 4,646,850 | 3/1987 | Brown et al. | 172/551 |
| 4,871,031 | 10/1989 | Kestel | 172/556 X |

FOREIGN PATENT DOCUMENTS

| 1955976 | 5/1978 | Australia . |
| 2637377 | 1/1979 | Australia . |
| 4949985 | 5/1986 | Australia . |
| 97106 | 7/1987 | Australia . |
| 7256187 | 11/1987 | Australia . |

Primary Examiner—Dennis L. Taylor
Assistant Examiner—Jeffrey L. Thompson
Attorney, Agent, or Firm—Ernest A. Beutler

[57] ABSTRACT

A rotary soil working tool comprising a rotatable support member having an engaging portion and a plurality of soil working elements each comprising an elongated member with a waisted portion. Each soil working element is detachably secured to the engaging portion such that the element extends outwardly of the support member. Preferably the support member is adapted to be rotabably supported on a hub.

10 Claims, 3 Drawing Sheets

ROTARY SOIL WORKING TOOL

This INVENTION relates to a rotary soil working tool.

In one form the invention resides in a rotary soil working tool comprising a rotatable support member having an engaging portion, a plurality of soil working elements, and securing means for detachably securing each soil working element to the engaging portion of the support member such that the element extends outwardly of the support member.

Preferably, said working element comprises an elongated member provided with a waisted portion and said securing means comprises a first fastening means for engaging the waisted portion of said elongated member.

Preferably, said securing means further comprises a second fastening means for engaging the elongated member at a location spaced from said waisted portion.

Preferably, said first and second fastening means each comprise a U-bolt. With this arrangement, the two legs of the U-bolt are adapted to engage one to each side of the respective elongated member with the bridge portion of the U-bolt extending across the elongated member. In the case of the U-bolt which constitutes the first fastening means, the legs thereof are received in the recesses created by the waisted portion so as to limit axial movement of the elongated member.

Preferably, the rotary soil working element is adapted to be detachably secured to the engaging portion at a position adjacent the outer peripheral portion of said engaging portion.

Preferably, said support member is adapted to be rotatably supported on a hub. In a preferred arrangement, said hub is mounted on one end of a swing arm the other end of which is mounted for pivotal movement about a substantially horizontal axis.

In another form the invention resides in an agricultural machine comprising a chassis, a swing arm one end of which is pivotally mounted on the chassis for rotation about a substantially horizontal axis, the other end of said swing arm supporting a rotary soil working tool as set forth in any one of the preceding paragraphs.

Preferably, said other end of the swing arm includes a hub assembly for receiving and supporting said rotary soil working tool. For preference there are two of said hub assemblies on said other end of the swing arm.

The invention will be better understood by reference to the following description of one specific embodiment thereof as shown in the accompanying drawings in which.

Figure 1:
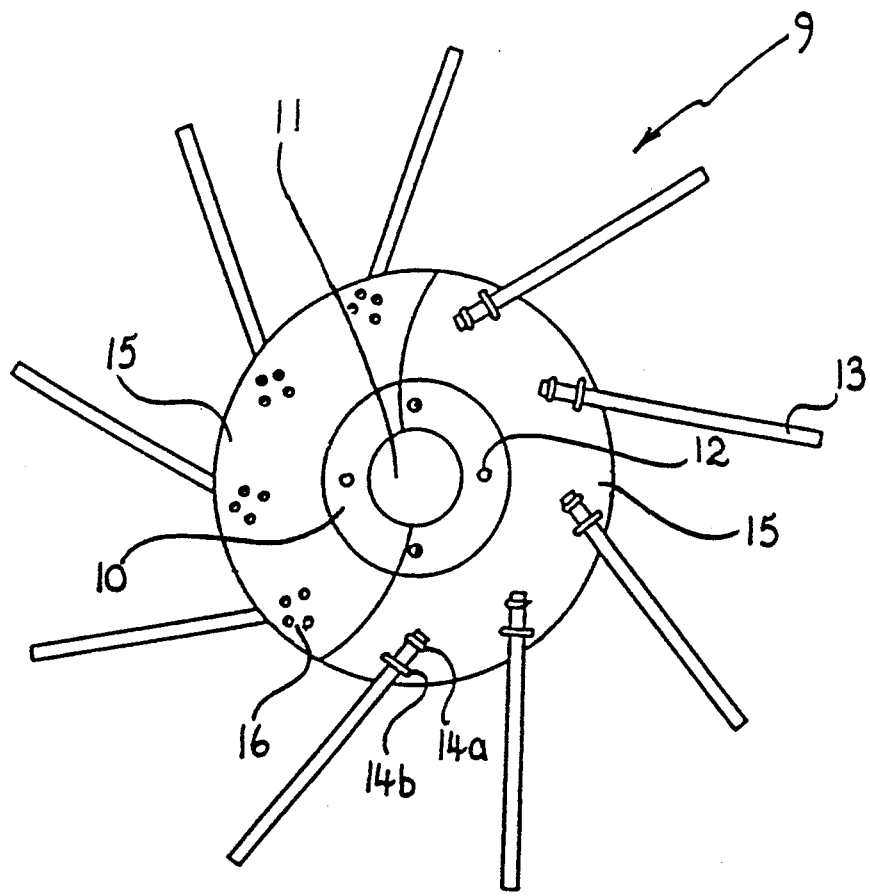
FIG. 1 is a side view of a rotary soil working tool according to the embodiment.
Figure 2:
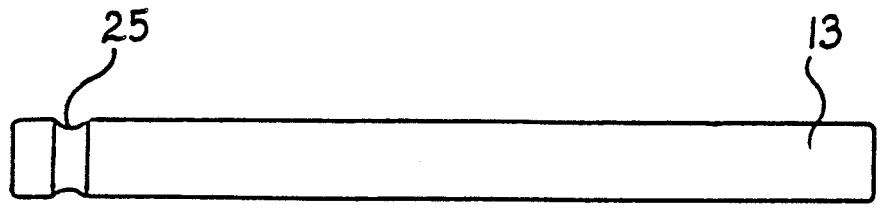
FIG. 2 is a soil working element forming part of the soil working tool.

The embodiment is directed to a rotary soil working tool for a rotary harrow.

The rotary soil working tool 9 comprises a support member 10 typically in the form of a disc having a central aperture 11 to allow rotatable mounting of the rotary soil working tool into a hub 20. The rotary soil working tool is mounted on the hub by any conventional means such as mounting bolts 21 passing through mounting apertures 12 on the support member adjacent the central aperture 11 and in a spaced relationship around the aperture.

A plurality of soil working elements 13 in the form of elongate tynes are detachably securable around the outer peripheral portion 15 of the support member 10. Each tyne is fixed adjacent one end thereof to a face of the peripheral portion of the support member 10 by first fastening means 14a and second fastening means 14b, each in the form of a U-bolt. The two U-bolts 14a and 14b have differing spacing between their arms, the reason for which will become apparent later.

Each tyne 13 is provided with a waisted portion 25 adjacent one end of the tyne to facilitate attachment to the support member. The waisted portion accommodates the U-bolt 14a which has the smaller spacing between the arms. This secures the tyne to the support member and resists movement of the tyne in the direction of its major axis on the support member.

A second U-bolt 14b which has the larger spacing between the arms, is provided at a position spaced from the first U-bolt member 14a to further secure the tyne 13 to the support member. Each of the U-bolts is attached to the support member by provision of suitably spaced apertures in the peripheral portion 15 of the support member 10 through which the bolts can pass and by the provision of suitably sized locking nuts indicated generally at 16. Typically about half of the tynes 13 are fixed to one face of the support member and the other half are fixed to the other face of the support member. With this arrangement, an adjacent tyne can be either on the same face or on the other face of the support member.

To replace worn or damaged tynes 13 the "U" shaped bolt of smaller diameter 14a is removed and the "U" shaped bolt of larger diameter 14b is loosened and the damaged or worn tyne is withdrawn from the support member. A replacement tyne can then be reattached to the support member in a quick and convenient manner and secured thereto by the "U" bolts. In this manner worn or damaged tynes can be quickly and readily replaced without the requirement of detaching and removing the rotary soil working tool from the hub as has been previously necessary with tynes which have been welded to the support member.

Figure 3:
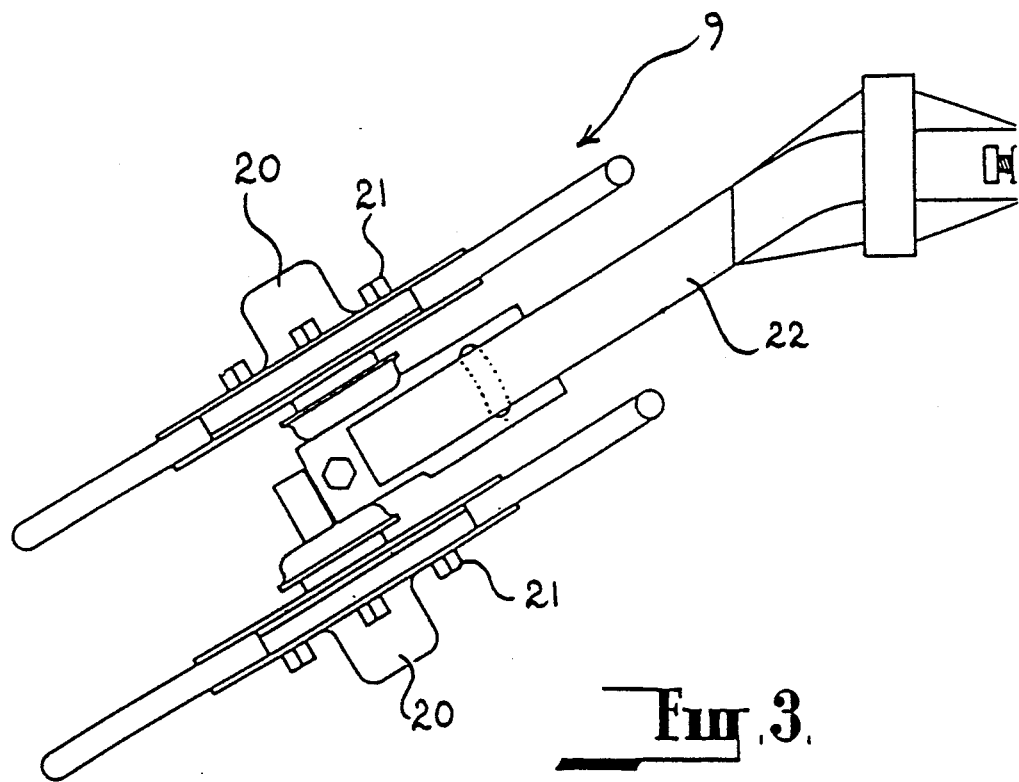
FIG. 3 is a plan view of a rotary soil working assembly incorporating a pair of rotary soil working tools of FIG. 1.
Figure 4:
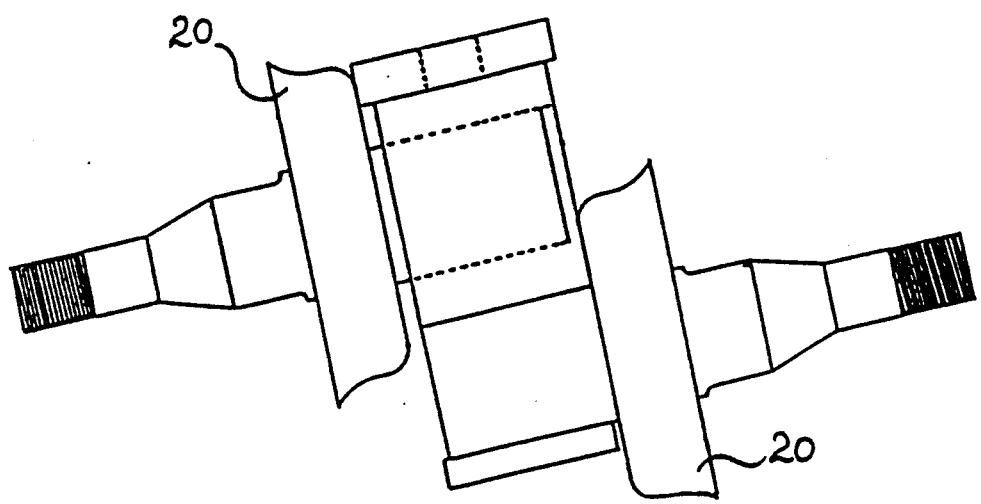
FIG. 4 is an end view of a swing arm and hub forming part of the assembly of FIG. 3.

In the arrangement shown in FIG. 3, the rotary soil working tool is mounted to the hub 20 which itself is secured to swing arm 22. Typically each swing arm is provided with two hubs in opposed relationship, each hub accommodating a rotary soil working tool.

The axes of rotation of the hubs 20 are parallel to each other and transverse to the direction of travel of the arm whereby the axis of rotation of each hub is oblique to the transverse axis.

Figure 5:
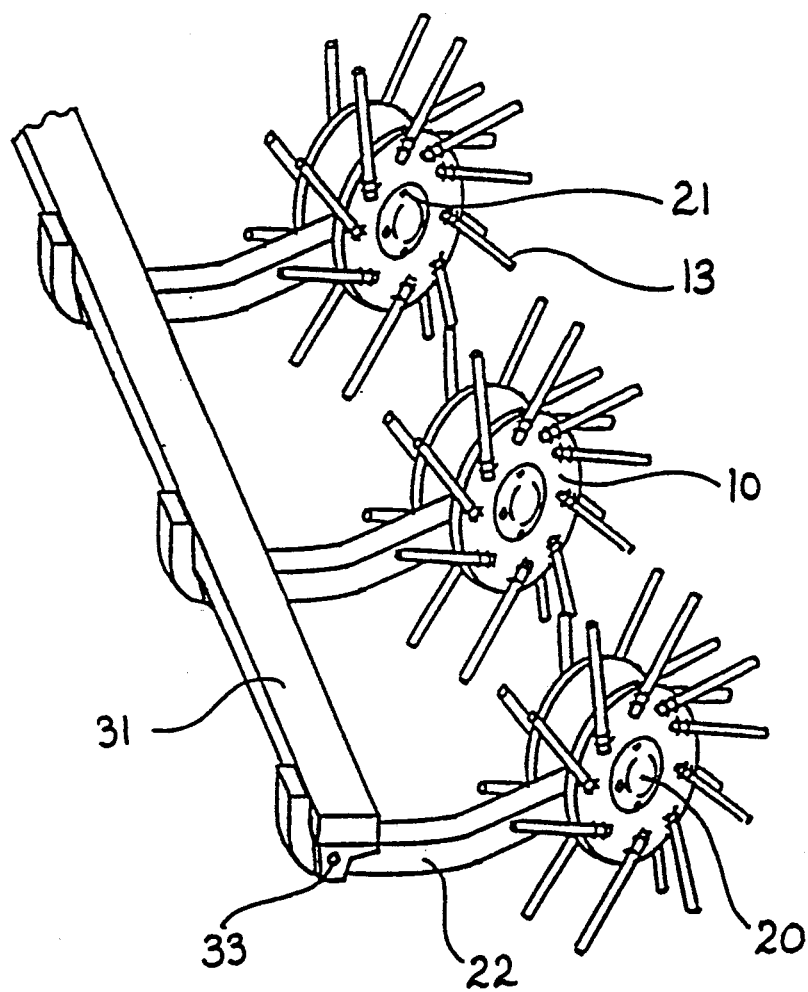
FIG. 5 is a part view of a rotary harrow having rotary soil working tool assemblies of FIG. 3.

The rotary soil working tool according to the embodiment can be employed on an agricultural ground working machine Which functions as a rotary harrow. Such a machine is illustrated in FIG. 5 of the drawings and comprises a chassis 31 from which is pivotally mounted a plurality of swing arms. The swing arm movement at the pivot is in a vertical plane about a generally horizontal axis.

The chassis is supported by wheels (not shown) placed ahead of the rotary soil working tool, and equipped with a draw bar (not shown) for attachment to locomotive means such as a tractor.

Due to each swing arm having a pivotal mounting 33, any undulations in the ground do not adversely affect the tilling operation, each swing arm supporting one or two rotary soil working tools being able to move up or down over bumps or dips without affecting operation of rotary soil working tools attached to the other swing arms.

Various other changes and modifications can be made to the embodiments described without departing from the spirit or scope of the invention.

The claims defining the invention are as follows:

1. A rotary soil working tool comprising a rotatable support member having an engaging portion, a plurality of soil working elements, each of said working elements having a soil engaging portion and a mounting portion including a waisted section, and securing means for detachably securing the mounting portion of each soil working element to the engaging portion of the support member such that the soil engaging portion thereof extends outwardly of said support member, said securing means comprising first fastening means for engaging and detachably securing said waisted section of said mounting portion to said engaging portion of said support member and second fastening means for engaging and detachably securing a non-waisted section of said mounting portion to said engaging portion of said support member at a location spaced from said waisted section such that said soil working element is detachable from the engaging portion by removing said first fastening means and loosening said second fastening means thereby permitting said soil working element to be removable from its mounting on said support member with said second fastening means in place.

2. A rotary soil working tool as claimed in claim 1 wherein said first fastening means comprises a U-bolt.

3. A rotary soil working tool as claimed in claim 2 wherein said second fastening means comprises a U-bolt.

4. A rotary soil working tool as claimed in claim 3 wherein the rotary soil working element is adapted to be detachably secured to the engaging portion at a position adjacent the outer peripheral portion of said engaging portion.

5. A rotary soil working tool as claimed in claim 1 wherein the rotary soil working element is detachably secured to the engaging portion at a position adjacent the outer peripheral portion of said engaging portion.

6. A rotary soil working tool as claimed in claim 1 wherein said support member is adapted to be rotatably supported on a hub.

7. A soil working tool as set forth in claim 1 in combination with an agricultural machine, comprising a chassis, a swing arm, one end of which is pivotally mounted on the chassis for rotation about a substantially horizontal axis, the other end of said swing arm supporting the rotary soil working tool.

8. An agricultural machine as claimed in claim 7 wherein said other end of the swing arm includes a hub assembly for receiving and supporting said rotary soil working tool.

9. An agricultural machine as claimed in claim 7 wherein said other end of the swing arm includes two hub assemblies, each for receiving and supporting one of said rotary soil working tools.

10. A rotary soil working tool as claimed in claim 1 wherein the second fastening means comprises a U-bolt.

* * * * *